June 20, 1967 D. S. WILLARD 3,327,304

COMMAND GENERATOR FOR REMOTE CONTROL SYSTEMS

Filed Oct. 15, 1963 2 Sheets-Sheet 1

INVENTOR.
DAVID S. WILLARD
BY Wade Koontz
ATTORNEY and
James S. Shannon
AGENT

INVENTOR.
DAVID S. WILLARD
BY Wade Koontz
ATTORNEY
James S. Shannon
AGENT

United States Patent Office 3,327,304
Patented June 20, 1967

3,327,304
COMMAND GENERATOR FOR REMOTE CONTROL SYSTEMS

David S. Willard, High Rolls, N. Mex., assignor to the United States of America as represented by the Secretary of the Air Force Filed Oct. 15, 1963, Ser. No. 316,479
4 Claims. (Cl. 340—348)

The invention described herein may be manufactured and used by or for the United States Government for governmental purposes without payment to me of any royalty thereon.

This invention relates to remote control systems and particularly to the command generator of a remote control system.

Certain remote control systems, such as one commonly used in balloon flight instrumentation, employ a coded command signal consisting of, for example, three different audio tones each of which may be steady, pulsed or off. The permutations of the three states of these tones provide twenty-six distinguishable commands, omitting the combination in which all tones are off. It is the principal object of the invention to provide a novel electronic circuit for generating electrical commands of this type that is simple, accurate and reliable.

Briefly, the command generator comprises an audio frequency gate for each audio tone used in the command signal and also a pulse gate associated with each audio gate. Rectangular control pulses are applied in parallel to all pulse gates but are passed by a pulse gate to an associated audio frequency gate only when the pulse gate has a steady gating voltage applied from a command selection switch. Each command selection switch controls one or more of the audio frequency gates, as required by the particular code, to open the gate continuously for the passage of a steady audio tone, or, through actuation of the associated pulse gate, to open the gate intermittently for producing a pulsed audio tone. The outputs of the audio gates are combined to form the code signal which is applied as a modulating signal to a transmitter for transmission to the receiving station. The command generator also provides an additional audio tone, different from any of the code signal tones, which is mixed with the code signal either continuously or during the interval between pulses to aid in automatic level control of the decoder input signal at the receiving station.

Figure 1:
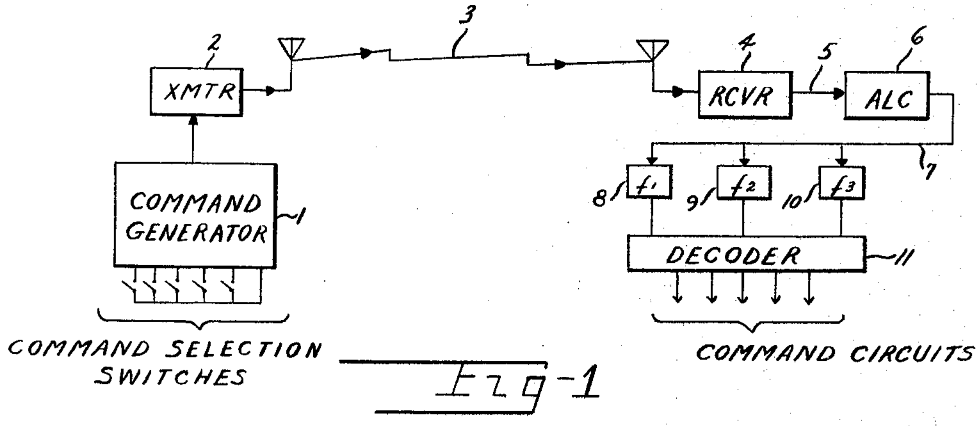
Figure 3:
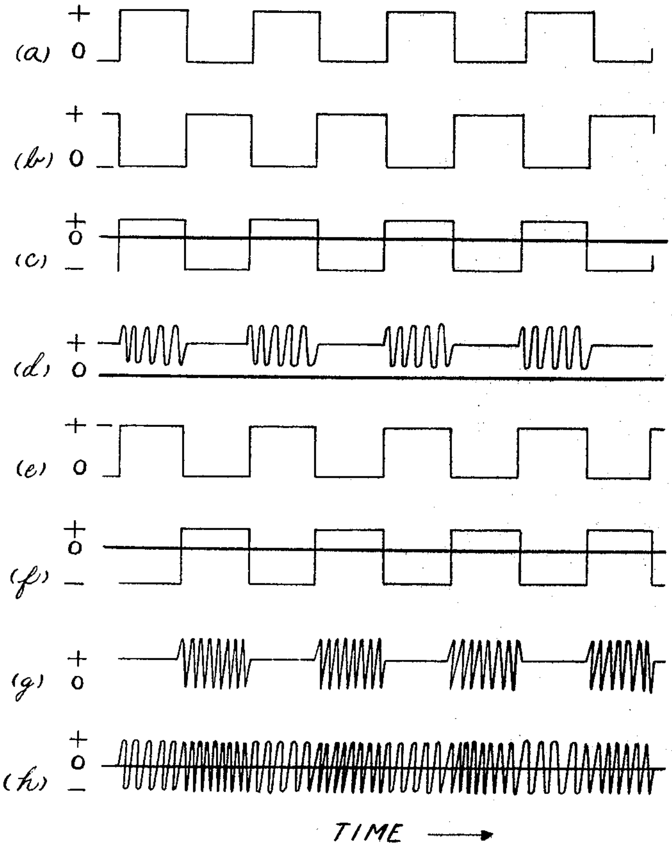
Figure 2:
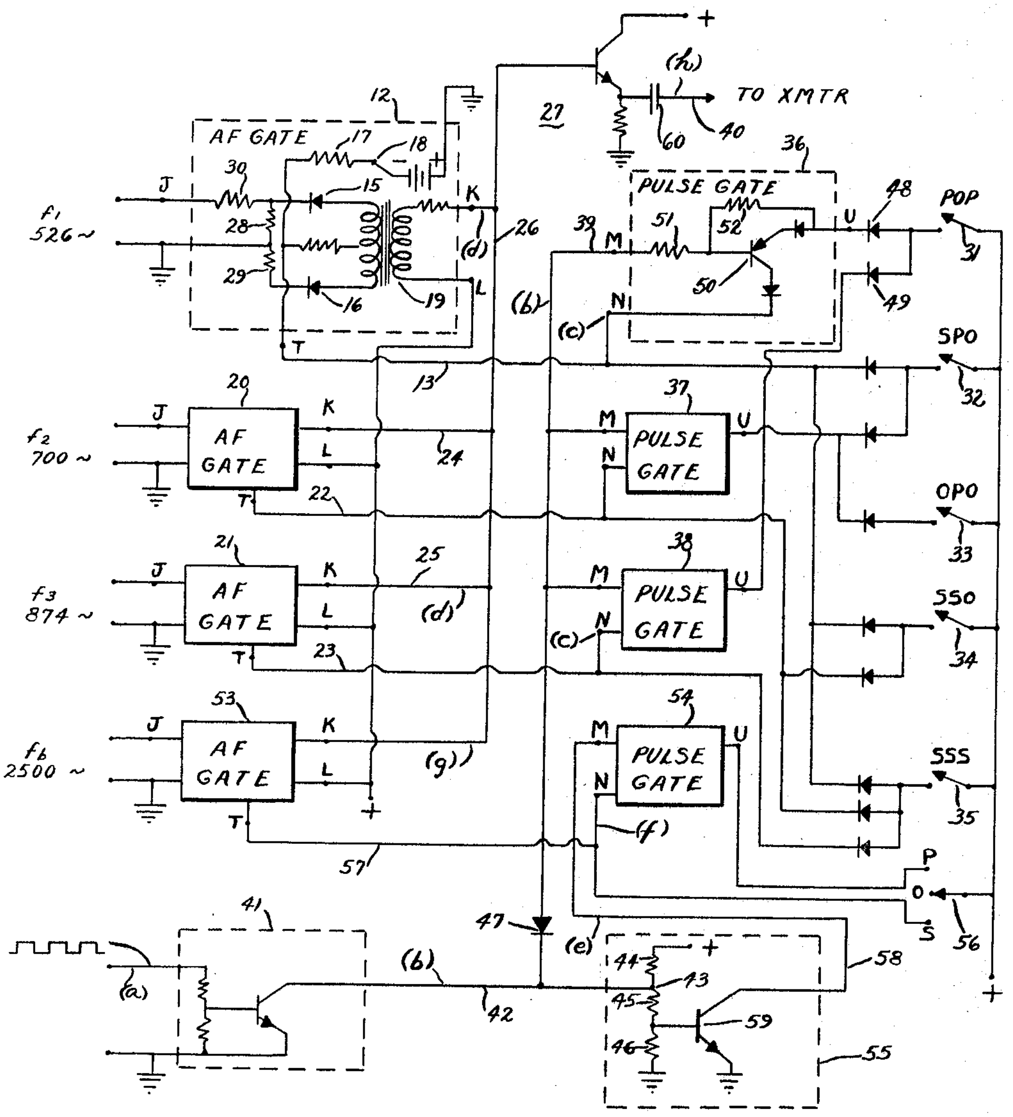

The invention will be described in more detail with reference to the specific embodiment thereof shown in the accompanying drawings in which FIG. 1 is a block diagram of a remote control system in which the described command generator may be used, FIG. 2 is a circuit diagram of a command generator in accordance with the invention, and FIG. 3 shows various waveforms occurring in the circuit of FIG. 2.

Referring to FIG. 1, block 1 represents the command generator to be described. In the system illustrated, a coded command signal consists of three audio tones $f_1$, $f_2$ and $f_3$ each of which may be steady, pulsed or off. Closure of any one of the command selection switches causes a coded signal of this type to be generated. This signal modulates transmitter 2 and is thus transmitted over radio link 3 to receiver 4 at a remote point. The received signal is demodulated in the receiver to recover the original code signal which appears on line 5. The receiving station may be equipped with an automatic level control circuit 6 for maintaining constant the amplitude of the code signal on line 7 which is to be applied to the decoder. The three audio tones, $f_1$, $f_2$ and $f_3$, making up the code signal are separated by filters 8, 9 and 10 and applied to decoder 11 which energizes the command circuit called for by the code.

The construction of the command generator 1 is shown in FIG. 2. Referring to this figure, the three audio tones, $f_1$=526c./s., $f_2$=700c./s. and $f_3$=874c./s., which constitute the code signal in the specific example to be described, are applied to the inputs of audio frequency (AF) gates 12, 20 and 21. These gates are all alike so that the schematic of gate 12 only is shown. In the absence of a positive gating voltage on terminal T the $f_1$ wave is blocked from reaching the gate output 14 by the open circuits at diodes 15 and 16, the anodes of which are biased negative relative to their cathodes by being connected through a relatively high resistance 17 to point 18 of negative potential. The magnitude of this bias is made greater than the amplitude of the $f_1$ wave across the diodes, thus blocking the passage of the audio frequency. The gate is opened for the passage of the $f_1$ wave to gate output terminals K–L by applying a positive gating voltage over line 13 to control terminal T of sufficient magnitude to bias the anodes of diodes 15 and 16 positively relative to the cathodes. The magnitude of this forward bias must be such that the resulting forward diode current is always greater than the superimposed audio current. Under this condition the audio current can flow in either direction through the diodes to the primary winding of transformer 19. By proper selection of resistors 28, 29 and 30 the currents flowing in the two halves of the transformer 19 primary due to the application of the gating voltage to its center tap may be made equal, so that application and removal of the gating voltage does not induce a spurious voltage in the secondary winding.

In a similar manner gates 20 and 21 are actuated by gating potentials on lines 22 and 23 to apply the audio tones $f_2$ and $f_3$ to the gate output circuits and thence over output lines 24 and 25 to common line 26. Here they are mixed with the audio tone $f_1$ from gate 12 and applied to the transmitter through emitter follower 27.

The embodiment of the command generator shown in FIG. 2 provides for the generation of any one of five commands by the closure of any one of the five command selection switches 31 through 35. The command generated by closure of each switch is indicated above the switch by a combination of the letters S (steady), P (pulsed) and O (off), the first letter referring to $f_1$, the second to $f_2$ and the third to $f_3$, as shown in the following table:

| Switch | Command | | |
|---|---|---|---|
| | $f_1$ | $f_2$ | $f_3$ |
| 31 | P | O | P |
| 32 | S | P | O |
| 33 | O | P | O |
| 34 | S | S | O |
| 35 | S | S | S |

Each code selection switch therefore operates to place each of the three AF gates 12, 20 and 21 in one of its three possible states, steady, pulsed and off. The steady state is established by applying a constant positive gating voltage to lines 13, 22 or 23; the pulsed state is established by applying a pulsed gating voltage to these lines; and the off state results when neither of these gating voltages is applied.

Pulse gates 36, 37 and 38, all alike, are provided for the application of pulsed gating voltages to the AF gates 12, 20 and 21, respectively. Since these circuits are alike, only circuit 36 is shown in detail. The input to pulse gate 36 is in the form of a negative-going rectangular pulse applied over line 39 to input terminal M. The operation of the gate is such that if there is a positive potential at control terminal U a corresponding positive-going rectangular pulse is applied through output terminal N and over line 13 to terminal T of AF gate 12 which opens this gate by producing conduction in diodes 15 and 16 as previously explained. On the other hand, if terminal U is disconnected from any external circuit this gating pulse does not appear on line 13.

The operation of pulse gate 36 and associated circuits will be more fully explained with reference to the waveforms in FIG. 3. Positive control pulses of constant pulse repetition rate, as shown at (*a*) in FIG. 3, are applied to the input of transistor switch 41. When the input voltage to this switch is zero, the switch presents practically an open circuit to line 42 and therefore this line has a positive potential relative to ground established by point 43 in the potential divider 44–45–46. During a positive pulse, however, the switch 41 practically short-circuits line 42 to ground so that its potential, and that of point 43, is substantially zero. The waveform on line 42 is therefore as shown at (*b*) in FIG. 3. The negative-going pulses constituting this wave are applied to line 39 and terminal M through diode 47.

When command selection switch 31 is open, terminal U of gate 36 is completely open circuited due to isolating diodes 48 and 49. Therefore, there is no emitter or collector current in transistor 50 so that the potential of line 13 is unaffected and diodes 15 and 16 remain biased beyond cut-off.

When switch 31 is closed a positive potential is applied to terminal U. Referring to waveform (*b*) on lines 42 and 39, during the time that line 39 and terminal M is positive its potential is only slightly less than the potential of line 40 by the amount of the drop across resistor 44 which is of much lower resistance than resistor 45. This small potential difference between terminal U and terminal M, together with the fact that resistor 51 has a much higher resistance than resistor 52, results in a very low emitter current in transistor 50 and, therefore, a very low collector current which does not raise the potential of terminal N and line 13 sufficiently to overcome the bias on diodes 15 and 16 and open AF gate 12. Consequently, the output from gate 12 is zero during the positive portions of waveform (*b*), i.e. during the intervals between the positive control pulses of waveform (*a*) applied to switch 41.

For the duration of each positive pulse in waveform (*a*) the potential of line 39 is zero as seen in waveform (*b*). This drop in the potential of line 39 and terminal M produces a large increase in emitter current in transistor 50. The resulting increase in collector current raises the potential of line 13 sufficiently to overcome the bias and produce forward conduction in diodes 15 and 16, thus opening AF gate 12 and passing $f_1$ to the output terminals K–L of this gate. The waveform applied by pulse gate 36 to conductor 13 is therefore as shown at (*c*) in FIG. 3 and the waveform between terminals K–L is as shown at (*d*).

The operation of pulse gates 37 and 38 in controlling their associated AF gates 20 and 21 is identical in all respects to the above-described operation of pulse gate 36. As seen in FIG. 2, closure of command selection switch 31 also applies positive potential to pulse gate 38 through isolating diode 49. This results in waveform (*c*) on line 23 and waveform (*d*) on AF gate 21 output line 25, where the output is the same as the output from AF gate 12 except that the audio tone is of frequency $f_2$ instead of $f_1$. Since switch 31 applies no potential either to pulse gate 37 or directly to line 22 of AF gate 20, the output from this AF gate is zero. Consequently, closure of switch 31 causes the command POP to be generated.

Where the output of an AF gate is to be steady rather than pulsed the command selection switch applies a constant positive gating voltage directly to the gate terminal T. Thus switch 32 applies a positive voltage directly to terminal T of AF gate 12 over line 13 to produce an S output from this gate, a positive voltage to pulse gate 37 to produce a P output from AF gate 20, and no voltage to either pulse gate 38 or line 23 of AF gate 21 to produce a O output from this gate. Consequently, closure of switch 32 generates the command SPO.

It is seen therefore that the command generator is made up of a plurality of similar sections each receiving one of the audio tones and each containing an AF gate and a pulse gate. Thus, the section corresponding to $f_1$ contains AF gate 21 and pulse gate 36. The other sections, in the specific embodiment shown in FIG. 2, are 20–37 and 21–38 corresponding to $f_2$ and $f_3$, respectively. Each command selection switch operates when closed to apply a steady voltage to certain of the sections such that one of the states STEADY, PULSED and OFF exists at each section in an arrangement that is different from any permutation of these states that exists after closure of any other command selection switch. To establish the STEADY state the switch is connected to apply a steady voltage to control terminal T of the AF gate, whereas the PULSED state is established by applying a steady voltage to the control terminal U of the pulse gate. The OFF state exists when there is no connection from the switch to the section.

In order to improve the operation of the automatic level control circuit 6 at the receiving station (FIG. 1) provision is made in the command generator of FIG. 2 to prevent a break in the received signal such as would occur for example, in the POP command where the signal pulses are separated by intervals of no signal. This is accomplished by providing an additional audio tone $f_b$ of a frequency, for example 2500 c./s., not accepted by the code filters at the decoder. This tone may be transmitted continuously or it may be used to fill in between code signal pulses. For this purpose there are provided an additional AF gate 53, an additional pulse gate 54, a phase inverter 55 and an additional switch 56. AF gate 53 and pulse gate 54 are identical to gates 12 and 36, respectively.

With switch 56 in its lower position S, a constant positive gating voltage is applied to terminal T of AF gate 53 over conductor 57 causing this gate to apply a steady $f_b$ signal to common conductor 26 and thence to the input of emitter follower 27 along with the code signals.

With switch 56 in its upper position P, AF gate 53 applies a pulsed $f_b$ signal to conductor 26 in which the pulses of the tone $f_b$ occur between the pulses of the code tones applied to conductor 26 by the other AF gates 12, 20 and 21. To accomplish this the waveform (*b*), which is applied to the terminals M of the pulse gates 36, 37 and 38 is inverted by phase inverter 55 to produce the waveform (*e*) of FIG. 3 on conductor 58 and terminal M of pulse gate 54. By the process explained for gate 36, this produces the waveform (*f*) of FIG. 3 at terminal N which is applied to terminal T of AF gate 53 by conductor 57. The output of this gate at terminal K is therefore as seen at (*g*) in FIG. 3. The composite waveform resulting when waveforms (*d*) and (*g*) are mixed is shown at (*h*) in FIG. 3 as it appears on line 40 after removal of the direct current component by capacitor 60.

With switch 56 in its middle or O position neither a steady nor a pulsed gating voltage is applied to terminal T of AF gate 53 and this gate remains closed eliminating the frequency $f_b$ from the output signal of the command generator altogether.

The isolating diodes, such as 48 and 49, permit the use of single pole command selection switches. These diodes could be dispensed with by using multi-pole switches.

For simplicity only five command selection switches are shown in FIG. 2. However, it will be apparent that, using all the permutations of the three states of $f_1$, $f_2$ and $f_3$, a total of twenty-six commands can be generated by adding twenty-one additional switches each connected to the appropriate AF and pulse gates as required by the code of the particular command. Also, it is obvious that the capacity of the circuit can be extended further by increasing the number of audio tones to four or more.

I claim:

1. A command generator comprising: a plurality of similar sections each containing an audio frequency gate and a pulse gate, each gate having normally decoupled input and output circuits and a control circuit and being operative upon application of a gating potential to said control circuit to couple the input circuit to the output circuit for the duration of the gating potential, and means coupling the output circuit of said pulse gate to the control circuit of said audio frequency gate; means for applying audio signals of different frequencies to the inputs of the audio frequency gates in said sections; means for applying voltage pulses of constant repetition rate to the inputs of the pulse gates in said sections in parallel; a plurality of normally open command selection switches each connected to a source of steady gating voltage and to certain of said sections such that after closure one of the states STEADY, PULSED and OFF exists in each section in an arrangement that is different from any permutation of these states existing after the closure of any other of said switches, said states being characterized as follows:

STEADY—a steady gating voltage applied to the control circuit of the audio frequency gate, PULSED—a steady gating voltage applied to the control circuit of the pulse gate, OFF—no gating voltages applied to the control circuits of the audio and pulse gates;

a command output circuit; and means for coupling the output circuits of said audio gates to said command output circuit in parallel.

2. Apparatus as claimed in claim 1 in which there is provided an additional audio frequency gate similar to the audio frequency gates in said sections; means for applying to the input circuit of said additional gate an audio signal of frequency different from any of the frequencies of the audio signals applied to the audio frequency gates in said sections; means controlled by the voltage pulses applied to said pulse gates for applying a gating voltage to the control circuit of said additional gate during the intervals between said voltage pulses; and means coupling the output of said additional gate to said command output circuit.

3. Apparatus as claimed in claim 1 in which means are provided for continuously applying to said output command circuit an audio signal of frequency different from any of the frequencies of the audio signals applied to the audio frequency gates in said sections.

4. Apparatus as claimed in claim 1 in which each of said audio frequency gates comprises a transformer having a center-tapped primary winding and a secondary winding, said secondary winding constituting the gate output; a pair of diodes having like poles connected to the outer terminals of said primary winding; coupling means connecting the gate input between the other poles of said diodes, said coupling means establishing equal impedances between the outer terminals of said primary winding and a point of reference potential in said input; means connecting the gate control circuit between the center tap of said primary winding and said point of reference potential; and a source of biasing potential and a resistance connected in series between said point of reference potential and the center tap of said primary winding, said biasing potential being of proper magnitude and polarity to bias said diodes beyond cut-off.

References Cited

UNITED STATES PATENTS 3,035,250 5/1962 Durkee et al. ------ 340—348 X
3,140,468 7/1964 Blaisdell et al. ---- 340—351 X NEIL C. READ, *Primary Examiner.*

D. YUSKO, *Assistant Examiner.*